US009212604B2

(12) United States Patent
Danforth, III et al.

(10) Patent No.: US 9,212,604 B2
(45) Date of Patent: Dec. 15, 2015

(54) SOUND SHIELD CORNER JOINT

(71) Applicant: Kohler Co., Kohler, WI (US)

(72) Inventors: Robert J. Danforth, III, Sheboygan Falls, WI (US); Doug Hasenstein, Sheboygan, WI (US); Kenneth Watry, Fredonia, WI (US); Travis Andren, Sheboygan, WI (US)

( * ) Notice: Subject to any disclaimer, the term of this patent is extended or adjusted under 35 U.S.C. 154(b) by 478 days.

(21) Appl. No.: 13/672,755

(22) Filed: Nov. 9, 2012

(65) Prior Publication Data

US 2014/0133069 A1 May 15, 2014

(51) Int. Cl.
*H02B 1/00* (2006.01)
*F02B 63/04* (2006.01)
*F16M 3/00* (2006.01)

(52) U.S. Cl.
CPC ............... *F02B 63/04* (2013.01); *F02B 63/044* (2013.01); *F16M 3/00* (2013.01); *F02B 2063/045* (2013.01)

(58) Field of Classification Search
None
See application file for complete search history.

(56) References Cited

U.S. PATENT DOCUMENTS

| | | | |
|---|---|---|---|
| 5,850,061 | A | 12/1998 | Klompenhouwer et al. |
| 6,630,756 | B2 | 10/2003 | Kern et al. |
| 7,543,793 | B2 | 6/2009 | Graham et al. |
| 7,642,665 | B2 | 1/2010 | Konop et al. |
| 7,902,705 | B2 | 3/2011 | Gravlin et al. |
| 8,143,755 | B2 | 3/2012 | Gravlin et al. |
| 2011/0272952 | A1 | 11/2011 | Richardson et al. |

*Primary Examiner* — Courtney Smith

(74) *Attorney, Agent, or Firm* — Schwegman Lundberg & Woessner, P.A.

(57) ABSTRACT

Some embodiments relate to a power generation system that includes an alternator and an engine that drives the alternator to generate power. The power generation system further includes a housing where the alternator and the engine are within the housing. The housing may provide improved sound attenuation when the power generation system is operating. The housing includes a first corner rail such that a bracket is connected to one end of the first corner rail and at least one side panel. The bracket is connected along an edge of the first corner rail. The first corner rail includes a channel that extends from the end of the first corner rail along a length of the first corner rail. The power generation system includes a first fastener that extends into the channel to connect the bracket to the first corner rail.

17 Claims, 5 Drawing Sheets

SOUND SHIELD CORNER JOINT

TECHNICAL FIELD

Embodiments pertain to a power generation system, and more particularly to a power generation mounting system that readily permits installation and maintenance of engines and/or alternators that are mounted within the housings of such systems.

BACKGROUND

A typical standby generator is used to provide emergency power during sudden power outages. As examples, when primary utility power is lost during severe weather conditions, a blackout occurs and/or there is an overworked power grid where some locations lose power.

Standby generators are often used to provide power to homes, offices and/or businesses. In some instances, standby generators are used as a main power source (e.g., in remote locations).

Many standby generator systems include an internal combustion engine and alternator. The engine provides power that is used to turn a rotor within a stator that forms an alternator such that the alternator is able to generate power.

These standby power generation systems are typically located just outside of an environment (e.g., a building) where the generator is supposed to provide power to when needed. The generator is typically located within a housing that reduces exposure to the elements and provides sound attenuation features.

One of the drawbacks with known generator housings is that they do not provide optimal sound attenuation when the generator is in use. Therefore, a need exists for a housing that provides improved sound attenuation when a generator is operating.

Another drawback with existing generating housings is that they do not provide easy access to the generator. This lack of access to the generator often makes it difficult to install, repair and/or transport the generator (especially when the generator is used in marine applications). Therefore, a need exists for a housing that provides easy access to the generator that is within the housing.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
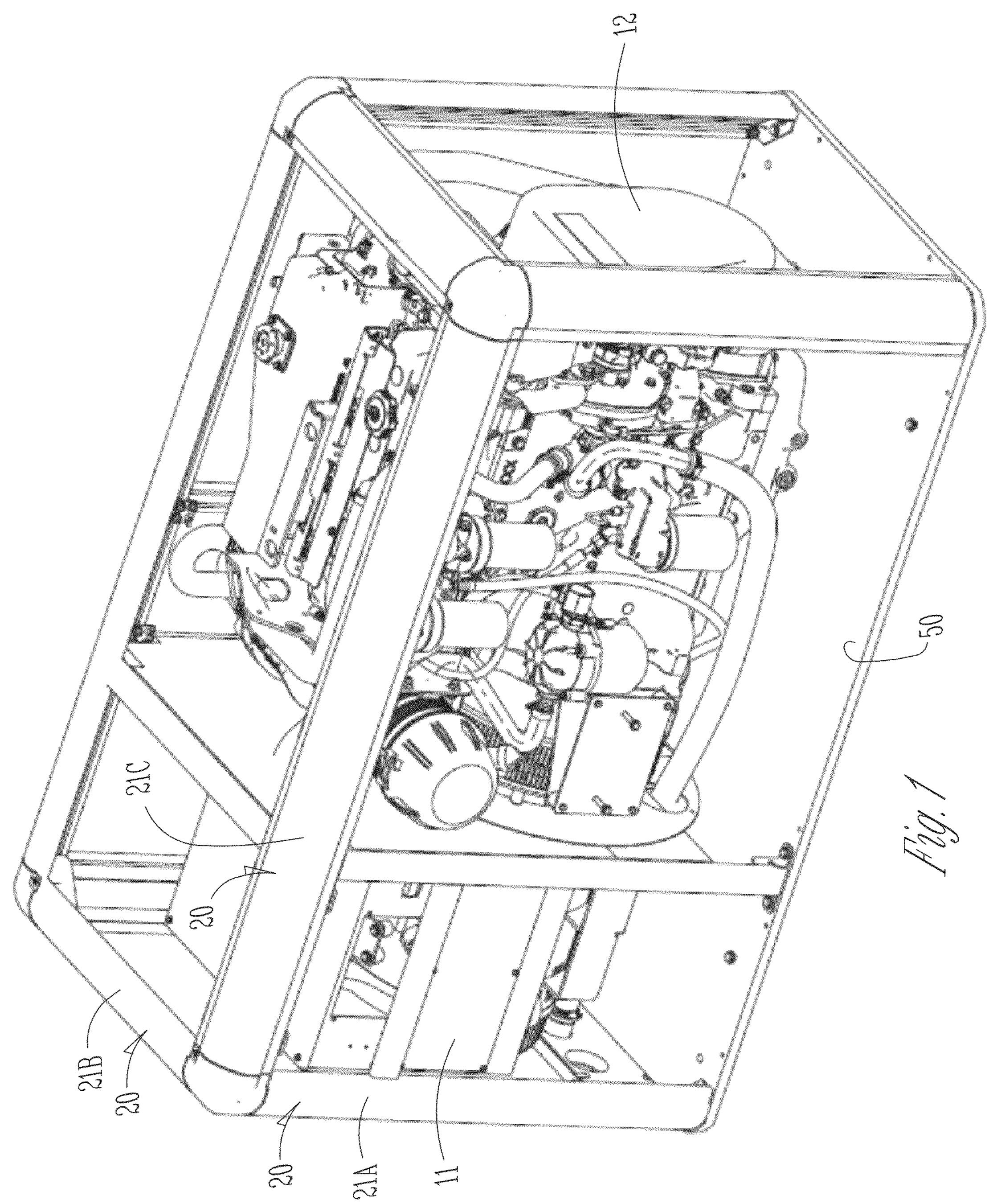
FIG. 1 is a perspective view of an example power generation system.

FIG. 1 is a perspective view of an example power generation system. The power generation system 10 includes an alternator 11 and an engine 12 that drives the alternator 11 to generate power. The power generation system 10 further includes a housing 20 (only housing frame 20 is shown in FIG. 1) where the alternator 11 and the engine 12 are within the housing 20. The housing 20 may provide improved sound attenuation when the power generation system 10 is operating.

Figure 5:
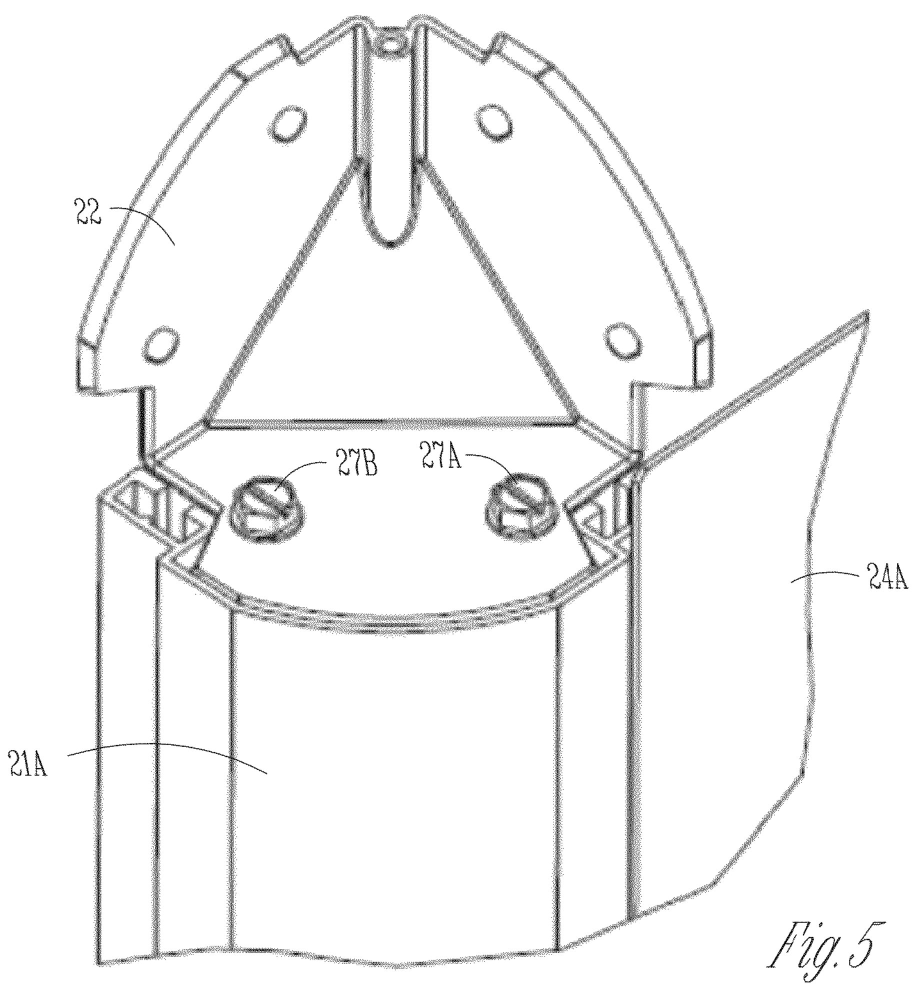
FIG. 5 is a perspective view illustrating an example corner rail and bracket connection that may be used in the power generation system shown in FIG. 1.
Figure 6:
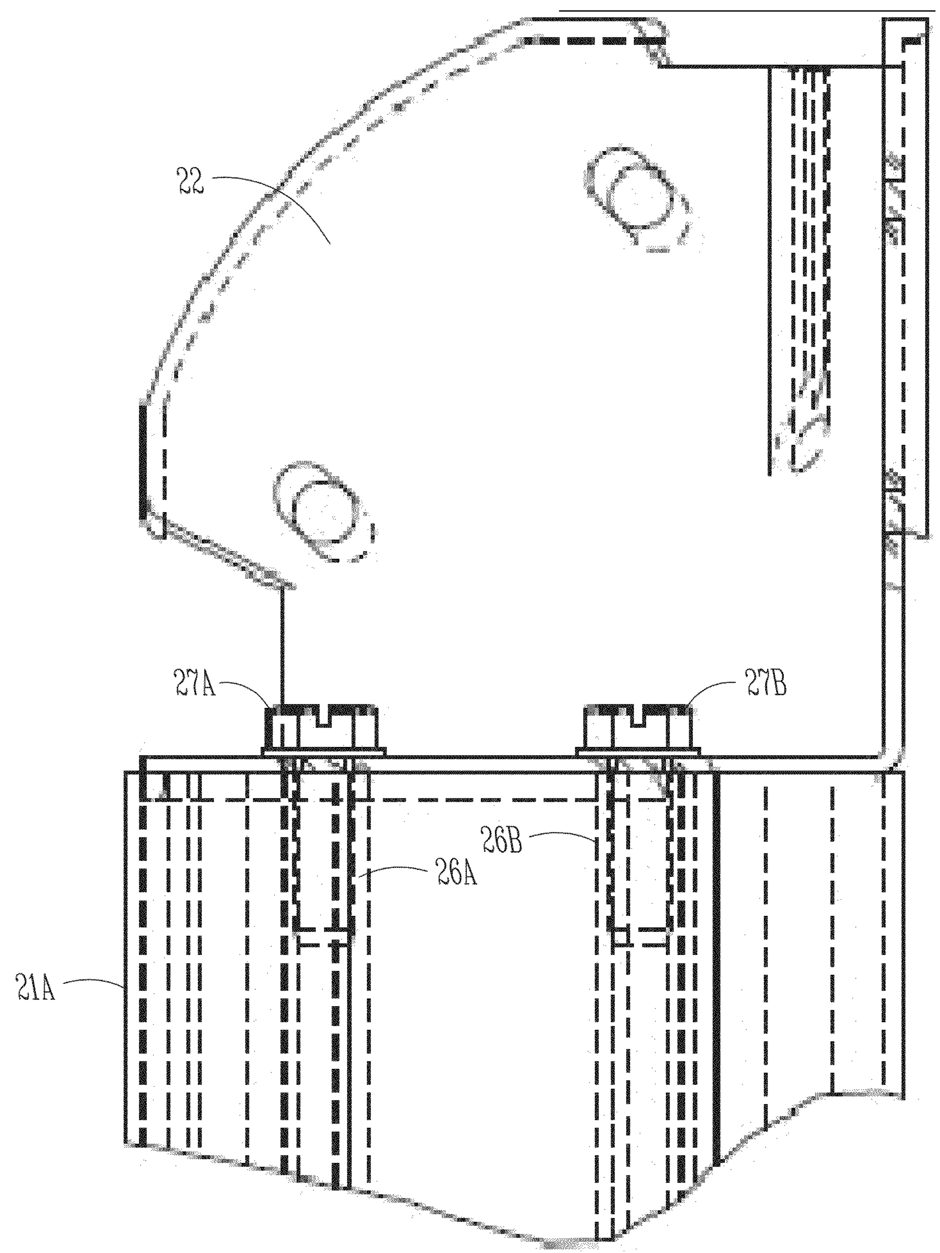
FIG. 6 is a side view of the example corner rail and bracket connection shown in FIG. 5.

As also shown in FIGS. 2-7, the housing 20 includes a first corner rail 21A such that a bracket 22 (see FIG. 4) is connected to one end of the first corner rail 21A and at least one side panel 24A (see FIG. 5). The bracket 22 is connected along an edge of the first corner rail 21A. As shown most clearly in FIG. 3, the first corner rail 21A includes a channel 26A that extends from the end of the first corner rail 21A along a length of the first corner rail 21A.

The power generation system 10 includes a first fastener 27A (see FIGS. 5 and 6) that extends into the channel 26A to connect the bracket 22 to the first corner rail 21A. In some embodiments, the first fastener 27A may be a self-tapping screw that extends into the channel to potentially promote relatively easy fastening of the bracket 22 to the first corner rail 21A.

In the example embodiment that is shown in the FIGS., the channel 26A may have a C-shaped cross-section that promotes insertion of the first fastener 27A into the channel 26A. It should be noted that other embodiments are contemplated where the channel 26A has a different cross-sectional shape.

Figure 2:
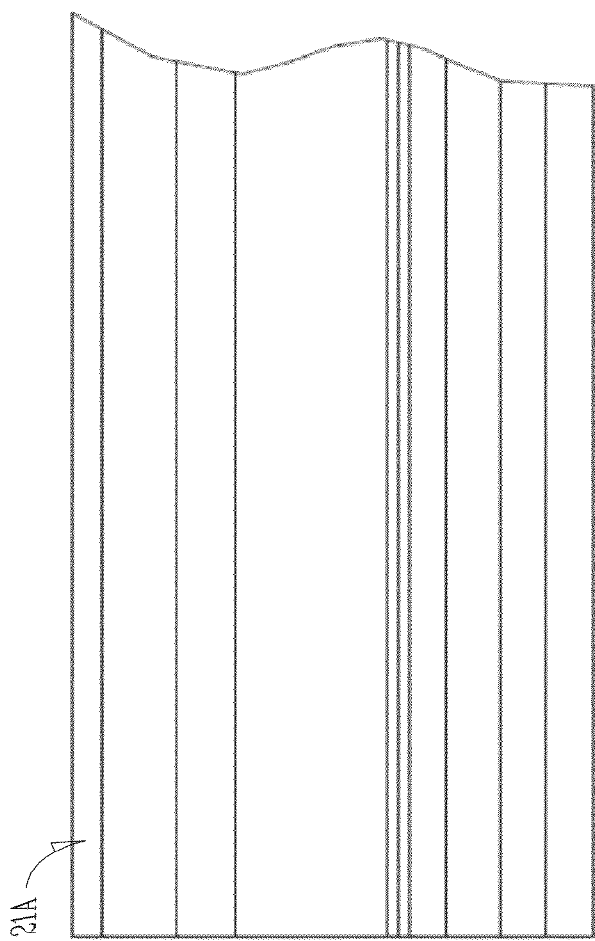
FIG. 2 is a side view of an example corner rail that may be used in the power generation system shown in FIG. 1.
Figure 3:
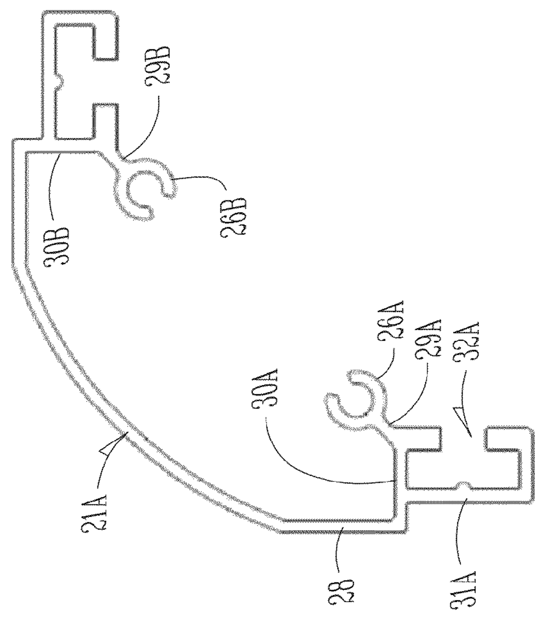
FIG. 3 is an end view of the example corner rail shown in FIG. 2.
Figure 4:
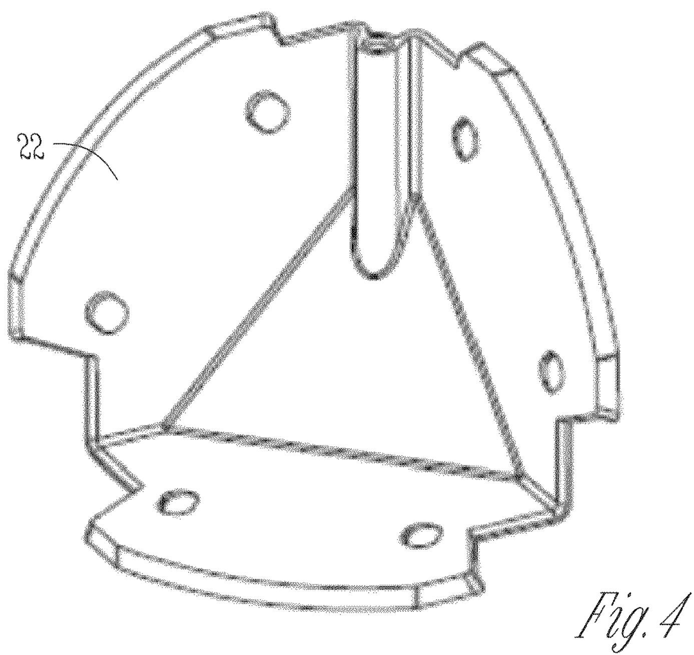
FIG. 4 is a perspective view of the example bracket that may be used in the power generation system shown in FIG. 1.

In the example embodiment that is shown in FIGS. 2 and 3, the first corner rail 21A is an extrusion such that the channel 26A extends along an entire length of the first corner rail 21A. It should be noted that embodiments are contemplated where the channel 26A extends along a portion of the first corner rail 21A.

In the example embodiment that is shown in the FIGS. 2 and 3, the first corner rail 21A may include a base 28 and a projection 29A that extends from the base 28. The channel 26A is at the end of the projection 29A.

As shown most clearly in FIG. 3, the base 28 is arcuate-shaped. In addition, the first corner rail 21A may include a member 30A that extends orthogonally from the base 28 such that the projection 29A extends from the member 30A.

In some embodiments, the member 30A forms part of a structure 31A at the edge of the first corner rail 21A. As an example, the structure 31A may include a T-shaped opening 32A that may promote securing the first corner rail 21A to other components in the power management system 10 (e.g., a base 50 (see FIG. 1) of the housing 20 or the side panel 24A).

As shown most clearly in FIG. 2, the first corner rail 21A may further include an additional channel 26B that extends from the end of the first corner rail 21A along a length of the first corner rail 21A. The power management system 10 may then further include an additional fastener 27B (see FIGS. 5 and 6) that extends into the additional channel 26B to connect the bracket 22 to the first corner rail 21A. The first corner rail 21A may further include an additional member 30B that extends orthogonally from the base 28 such that an additional projection 29B extends from the additional member 30B.

In some embodiments, the member 30B forms part of a structure 31B at the edge of the first corner rail 21A. As an example, the structure 31B may include a T-shaped opening 32B that may promote securing the first corner rail 21A to other components in the power management system 10 (e.g., a base 50 (see FIG. 1) of the housing 20 or the second side panel 24B)

It should be noted the first corner rail 21A may include additional channels, and the power management system 10 may include additional fasteners that extend into the additional channels to connect the bracket 22 to the first corner rail 21A. Embodiments are also contemplated where the projections 29A, 29B, members 30A, 30B, and structures 31A, 31B have different sizes, shapes and orientations.

Figure 7:
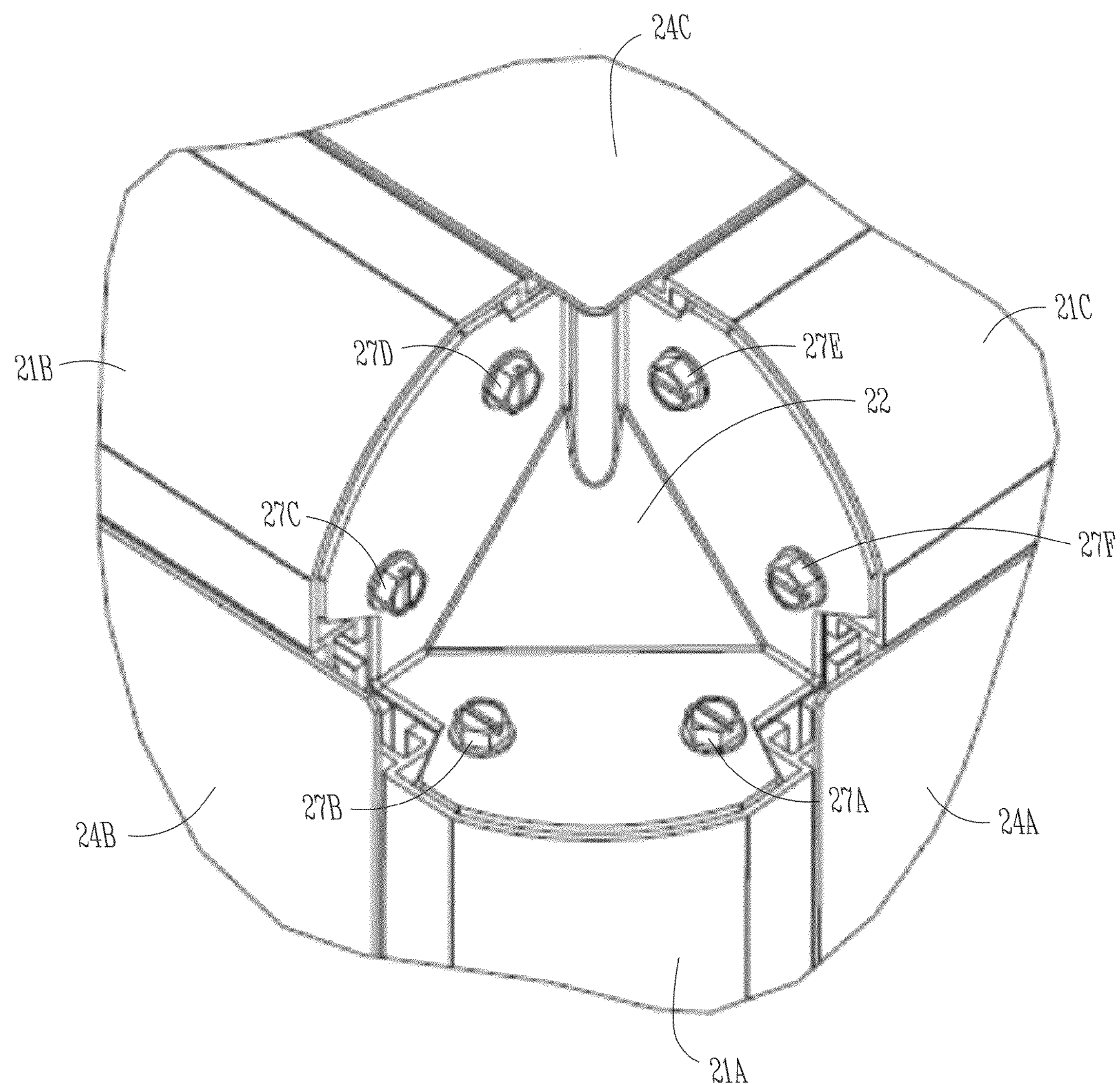
FIG. 7 is a corner perspective view illustrating a portion of the power generation system shown in FIG. 1.

FIG. 7 is a corner perspective view illustrating a portion of another example embodiment of the power generation system 10. In the example embodiment that is shown in FIG. 7, the housing 20 includes the first side panel 24A, a second side panel 24B and a top panel 24C.

The power generation system 10 further includes a second corner rail 21B that has the same configuration as the first corner rail 21A. The bracket 22 is connected to one end of the second corner rail 21B. The second side panel 24B is connected along a first edge of the second corner rail 21B and the top panel 24C is connected along a second edge of the second corner rail 21B.

The power generation system 10 may further include a third fastener 27C that extends through the bracket 22 into the first channel (not visible in FIG. 7) of the second corner rail 21B to secure the bracket 22 to the second corner rail 21B. In addition, a fourth fastener 27D may extend through the bracket 22 into the second channel (not visible in FIG. 7) of the second corner rail 21B to secure the bracket 22 to the second corner rail 21B.

The power generation system 10 may further include a third corner rail 21C that has the same configuration as the first and second corner rail 21A, 21B. The bracket 22 is connected to one end of the third corner rail 21C. The first side panel 24A is connected along a first edge of the third corner rail 21C and the top panel 24C is connected along a second edge of the third corner rail 21C.

The power generation system 10 may further include a fifth fastener 27E that extends through the bracket 22 into the first channel (not visible in FIG. 7) of the third corner rail 21C to secure the bracket 22 to the third corner rail 21C. In addition, a sixth fastener 27F may extend through the bracket 22 into the second channel (not visible in FIG. 7) of the third corner rail 21C to secure the bracket 22 to the third corner rail 21C.

It should be noted the first, second and third corner rails 21A, 21B, 21C may have the same configuration or different configurations. As an example, each of the first, second and third corner rails 21A, 21B, 21C may include the same or different number and/or type of channels. Embodiments are also contemplated where the first, second and third corner rails 21A, 21B, 21C include the same (or different) number, orientation and/or type of projections, members, and structures.

The example power generation system 10 described herein may provide improved sound attenuation when the power generation system 10 is operating. In addition, the example power generation system 10 includes a housing 20 that provides easy access to the components that are within the housing.

The housing may allow for one of the side or top panels (along with the corresponding brackets that are connected with the relevant side or top panel) to be readily removed from the rest of the housing thereby permitting easier repair, maintenance or installation inside the housing. As an example, a bracket at one corner of the housing may be removed by unscrewing fasteners, and when a bracket at an adjacent corner of the housing is removed by unscrewing other fasteners, a side or top panel that is connected to the two adjacent brackets may be removed from the rest of the housing.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power generation system comprising:
- an alternator;
- an engine that drives the alternator to generate power;
- a housing where the alternator and the engine are within the housing, wherein the housing includes a corner rail such that a bracket is connected to one end of the corner rail and at least one side panel connected along an edge of the corner rail, wherein the corner rail includes a channel that extends from the end of the corner rail along a length of the corner rail;
- a fastener that extends into the channel to connect the bracket to the corner rail;
- wherein the corner rail includes a base and a member that extends orthogonally from the base and forms part of a structure at the edge of the corner rail; and wherein the corner rail includes a projection such that the projection extends from the member.

2. The power generation system of claim 1, wherein the fastener is a self-tapping screw.

3. The power generation system of claim 1, wherein the channel extends along a portion of the corner rail.

4. The power generation system of claim 1, wherein the channel extends along an entire length of the corner rail.

5. The power generation system of claim 1, wherein the base is arcuate-shaped.

6. The power generation system of claim 1, wherein the structure includes a T-shaped opening.

7. The power generation system of claim 1, wherein the channel has a C-shaped cross-section.

8. The power generation system comprising:
- an alternator;
- an engine that drives the alternator to generate power;
- a housing where the alternator and the engine are within the housing, wherein the housing includes a corner rail such that a bracket is connected to one end of the corner rail and at least one side panel connected along an edge of the corner rail, wherein the corner rail includes a channel that extends from the end of the corner rail along a length of the corner rail;
- a fastener that extends into the channel to connect the bracket to the corner rail; and
- wherein the corner rail includes an additional channel that extends from the end of the corner rail along a length of the corner rail, and further comprising an additional fastener that extends into the additional channel to connect the bracket to the corner rail.

9. The power generation system of claim 8, wherein the corner rail further includes an additional member that extends orthogonally from the base such that the additional projection extends from the additional member.

10. A power generation system comprising:
- an alternator;
- an engine that drives the alternator to generate power; and
- a housing where the alternator and the engine are within the housing, wherein the housing includes:

a first side panel:

a second side panel;

a top panel;

a first corner rail such that a bracket is connected to one end of the first corner rail, wherein the first side panel is connected along a first edge of the first corner rail and the second side panel is connected along a second edge of the corner rail, wherein the first corner rail includes a first channel that extends from the end of the first corner rail along a length of the first corner rail and a second channel that extends from the end of the corner rail along a length of the first corner rail;

a bracket that is located at the end of the first corner rail;

a first fastener that extends through the bracket into the first channel to secure the bracket to the first corner rail;

a second fastener that extends through the bracket into the second channel to secure the bracket to the first corner rail;

a second corner rail such that the bracket is connected to one end of the second corner rail, wherein the second side panel is connected along a first edge of the second corner rail and the top panel is connected along a second edge of the second corner rail, wherein the second corner rail includes a first channel that extends from the end of the second corner rail along a length of the second corner rail and a second channel that extends from the end of the second corner rail along a length of the second corner rail;

a third fastener that extends through the bracket into the first channel of the second corner rail to secure the bracket to the second corner rail;

a fourth fastener that extends through the bracket into the second channel of the second corner rail to secure the bracket to the second corner rail;

a third corner rail such that the bracket is connected to one end of the third corner rail, wherein the first side panel is connected along a first edge of the third corner rail and the top panel is connected along a second edge of the third corner rail, wherein the third corner rail includes a first channel that extends from the end of the third corner rail along a length of the third corner rail and a second channel that extends from the end of the third corner rail along a length of the third corner rail;

a fifth fastener that extends through the bracket into the first channel of the third corner rail to secure the bracket to the third corner rail; and a sixth fastener that extends through the bracket into the second channel of the third corner rail to secure the bracket to the third corner rail.

11. The power generation system of claim 10, wherein each of the first, second, third, fourth, fifth and sixth fasteners is a self-tapping screw.

12. The power generation system of claim 10, wherein both of the first and second channels in each of the respective first, second and third corner rails extends along an entire length of the respective first, second and third corner rails.

13. The power generation system of claim 10, wherein each of the first, second and third corner rails includes a base and first and second projections that extend from the respective base, wherein the first channel of each respective base is at an end of the first projection and the second channel of each respective base is at an end of the second projection.

14. The power generation system of claim 13, wherein each of the respective first, second and third corner rails includes a first member that extends orthogonally from the base such that the first projection on each of the respective first, second and third corner rail extends from the first member, and wherein each of the respective first, second and third corner rail includes a second member that extends orthogonally from the base such that the second projection on each of the respective first, second and third corner rail extends from the second member.

15. The power generation system of claim 14, wherein the first member of the first corner rails forms part of a structure at the edge of the first corner rail, wherein the structure connects the first side panel to the first corner rail;

wherein the second member of the first corner rails forms part of a structure at an opposing edge of the corner rail, wherein the structure connects the second side panel to the first corner rail;

wherein the first member of the second corner rails forms part of a structure at an edge of the corner rail, wherein the structure connects the second side panel to the second corner rail;

wherein the second member of the second corner rails forms part of a structure at an opposing edge of the corner rail, wherein the structure connects the top panel to the second corner rail;

wherein the first member of the third corner rails forms part of a structure at an edge of the third corner rail, wherein the structure connects the first side panel to the third corner rail; and wherein the second member of the third corner rails forms part of a structure at an opposing edge of the third corner rail, wherein the structure connects the top panel to the third corner rail.

16. The power generation system of claim 15, wherein the each of the structures in each of the respective first, second and third corner panels includes a T-shaped opening that is adapted to receive a clamping mechanism for securing other components to the respective first, second and third corner rails.

17. The power generation system of claim 10, wherein each of the first and second channels in each of the respective first, second and third corner rails has a C-shaped cross-section.

* * * * *